United States Patent
Ino

(10) Patent No.: US 8,888,093 B2
(45) Date of Patent: Nov. 18, 2014

(54) POSITION DETECTION DEVICE FOR DETECTING SHEET POSITION, CONVEYANCE DEVICE, AND IMAGE FORMATION DEVICE WITH THRESHOLD DETERMINATION UNIT

(71) Applicant: Canon Kabushiki Kaisha, Tokyo (JP)

(72) Inventor: Koichiro Ino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/799,606

(22) Filed: Mar. 13, 2013

(65) Prior Publication Data

US 2013/0277909 A1 Oct. 24, 2013

(30) Foreign Application Priority Data

Apr. 23, 2012 (JP) ................... 2012-098240

(51) Int. Cl.
- B65H 7/02 (2006.01)
- B65H 7/10 (2006.01)
- G01B 11/14 (2006.01)
- G03G 15/00 (2006.01)

(52) U.S. Cl.
CPC *B65H 7/10* (2013.01); *G01B 11/14* (2013.01); *G03G 15/6567* (2013.01)
USPC .......................... 271/227; 271/228

(58) Field of Classification Search
CPC .................................. B65H 9/002; B65H 9/20
USPC .................................. 271/227, 228
See application file for complete search history.

(56) References Cited

U.S. PATENT DOCUMENTS

| | | | |
|---|---|---|---|
| 6,153,888 A * | 11/2000 | Fournier et al. | 250/559.4 |
| 8,413,984 B2 * | 4/2013 | Satoh et al. | 271/227 |
| 2005/0104282 A1* | 5/2005 | Mandai et al. | 271/227 |
| 2007/0297821 A1* | 12/2007 | Yamauchi et al. | 271/265.01 |
| 2008/0122166 A1* | 5/2008 | Fukube | 271/265.01 |
| 2008/0236351 A1* | 10/2008 | Hidaka et al. | 399/407 |
| 2009/0206547 A1* | 8/2009 | Tokita et al. | 271/264 |
| 2009/0295079 A1 | 12/2009 | Kinoshita et al. | |
| 2011/0049794 A1* | 3/2011 | Kinoshita et al. | 271/227 |
| 2012/0061909 A1* | 3/2012 | Shikama et al. | 271/227 |
| 2012/0269563 A1* | 10/2012 | Ui | 399/367 |
| 2013/0307213 A1* | 11/2013 | Adachi | 271/227 |

FOREIGN PATENT DOCUMENTS

| | | | | |
|---|---|---|---|---|
| JP | 5-124752 A | 5/1993 | | |
| JP | 2004-025579 A | 1/2004 | | |
| JP | 2004025579 A * | 1/2004 | | B41J 2/44 |
| JP | 2009-286547 A | 12/2009 | | |

* cited by examiner

Primary Examiner — Gerald McClain
(74) Attorney, Agent, or Firm — Fitzpatrick, Cella, Harper & Scinto

(57) ABSTRACT

A threshold for detecting a position of a lateral edge of a sheet is more accurately determined, whereby the accuracy of detection of the lateral edge position of the sheet is improved. A line sensor includes a plurality of element blocks. Each element block includes a plurality of pixels. The threshold for detecting the lateral edge position is determined based on a light level and a dark level of signals output from an element block that is actually used to detect the lateral edge position of the sheet.

12 Claims, 13 Drawing Sheets

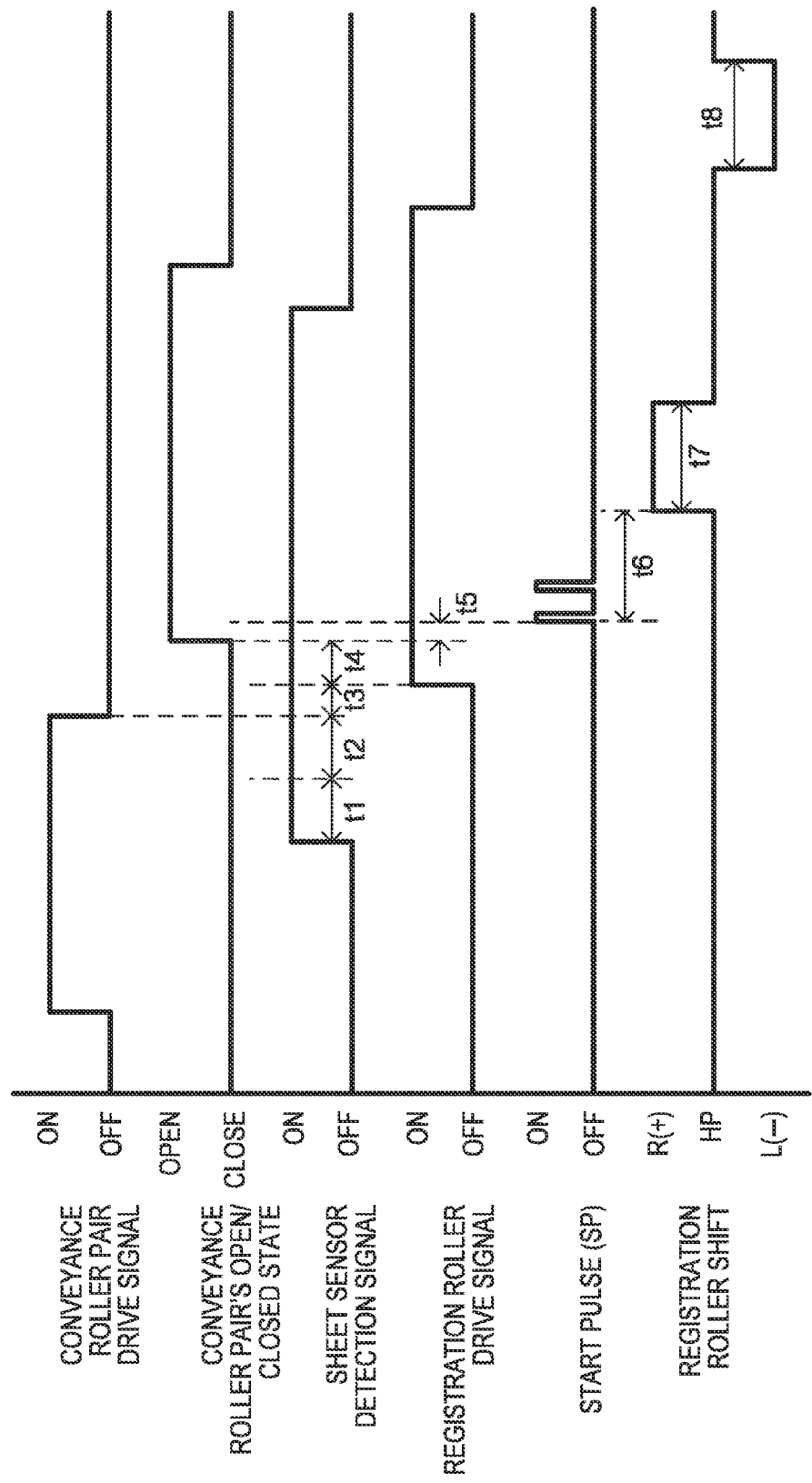

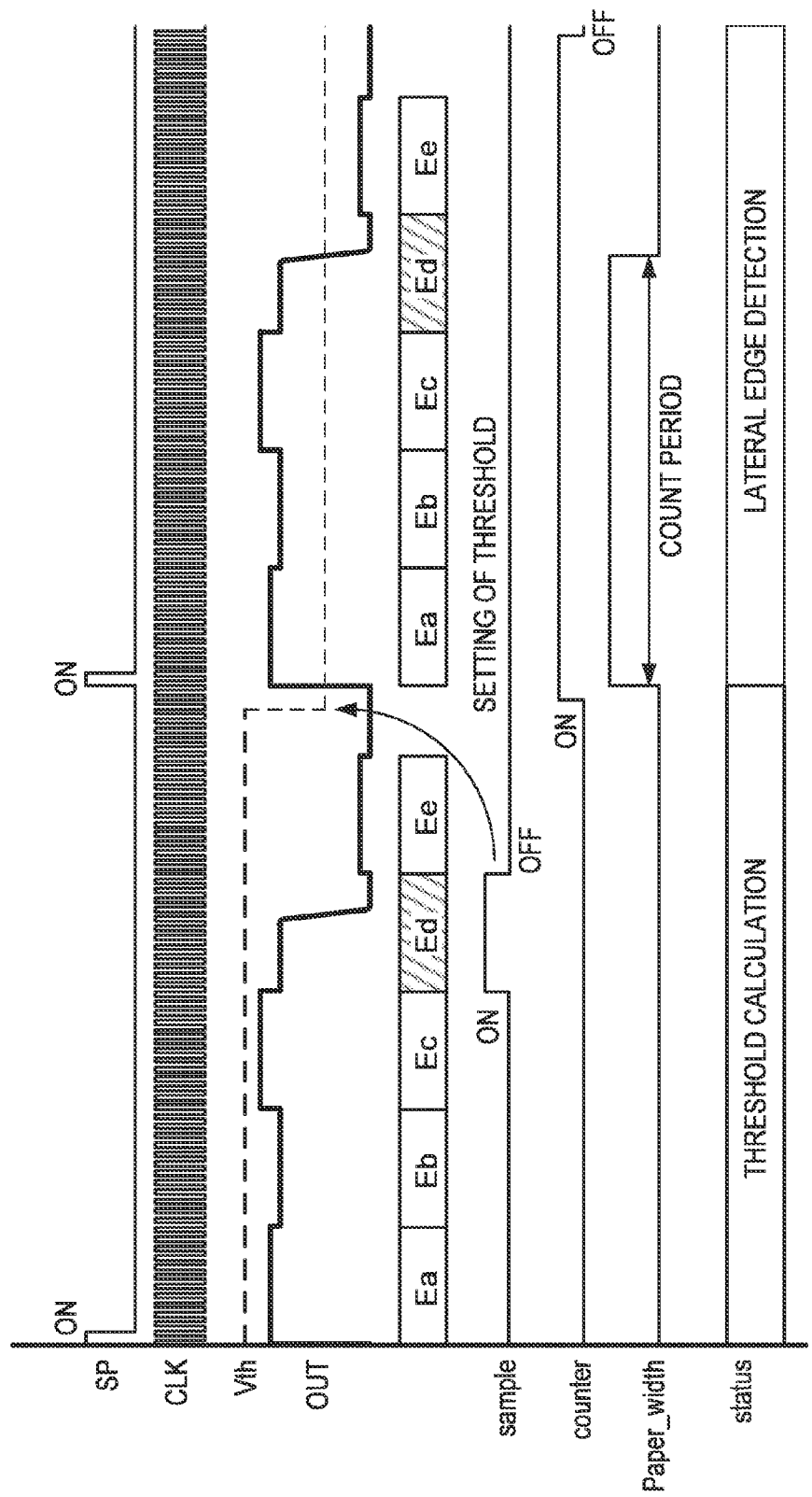

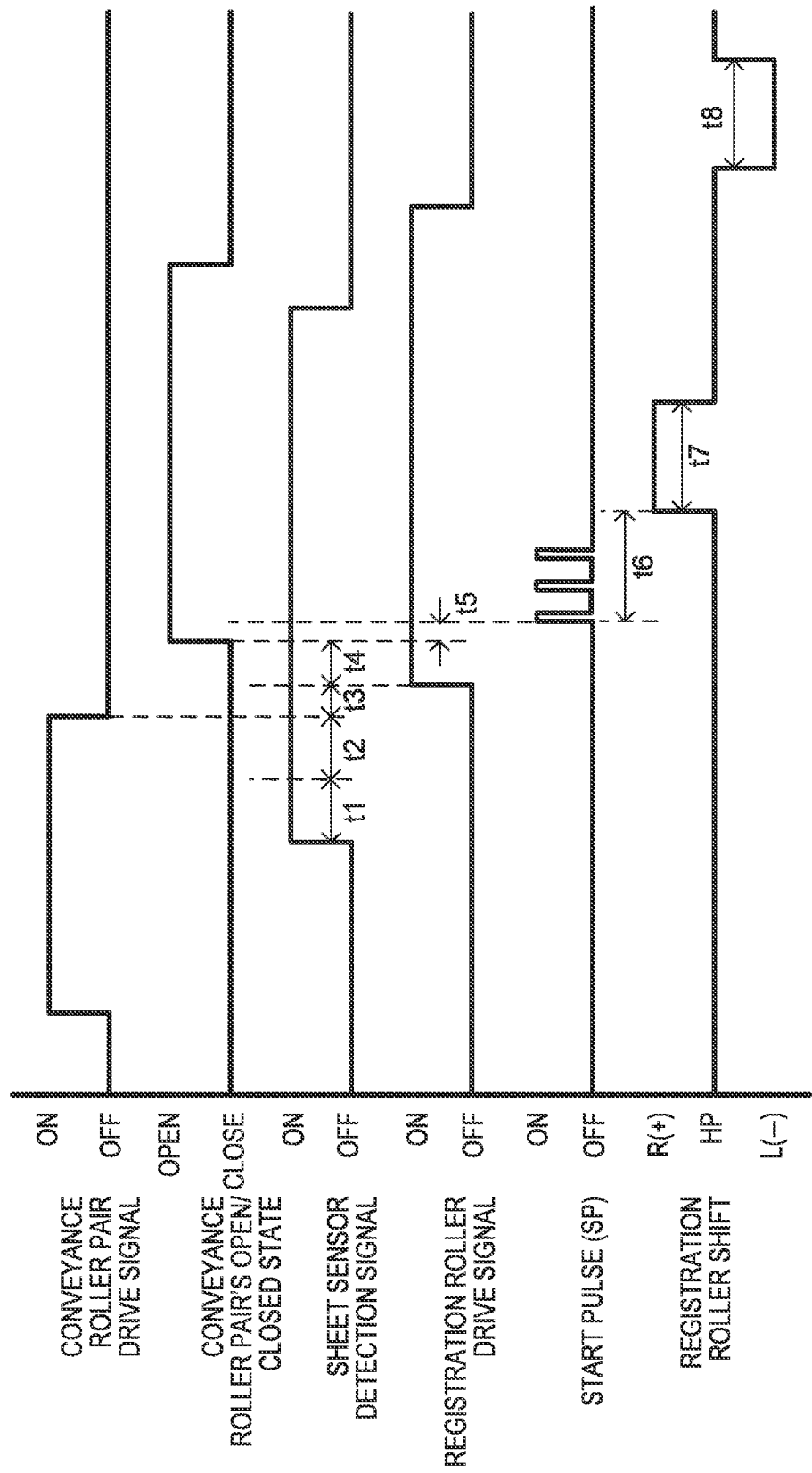

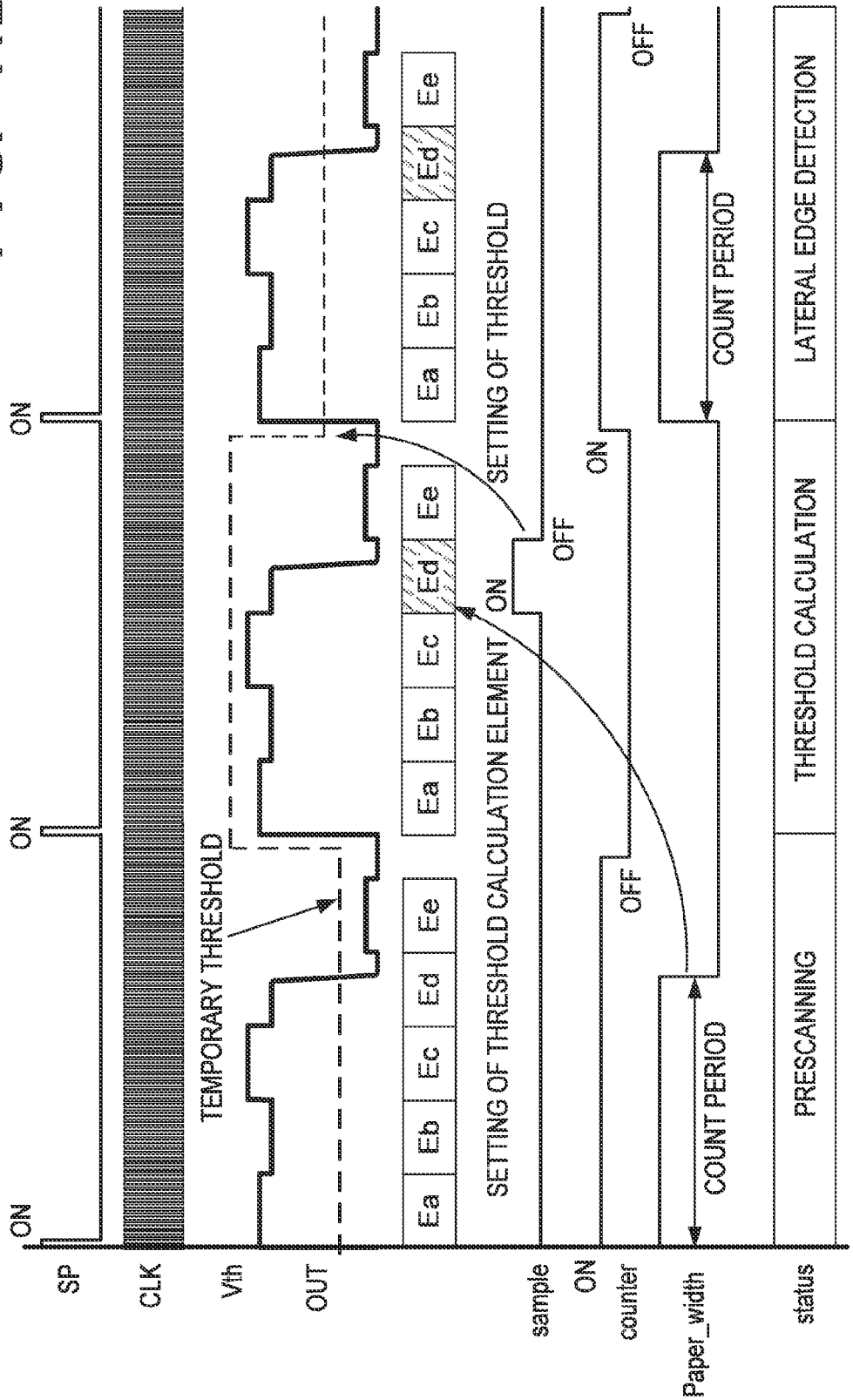

POSITION DETECTION DEVICE FOR DETECTING SHEET POSITION, CONVEYANCE DEVICE, AND IMAGE FORMATION DEVICE WITH THRESHOLD DETERMINATION UNIT

BACKGROUND OF THE INVENTION

1. Field of the Invention

The present invention relates to position detection devices for detecting a position of a sheet, conveyance devices, and image formation devices.

2. Description of the Related Art

Image formation devices control recording sheet conveyance and image formation so that an image is formed at a predetermined location on a recording sheet. If a recording sheet being conveyed is skewed relative to the conveyance direction (skew) or misaligned in a direction (lateral direction) perpendicular to the conveyance direction (lateral misalignment), an image is not formed at a predetermined location.

US 2009/0295079 proposes a skew correction mechanism that corrects a skew of a recording sheet. Japanese Patent Laid-Open No. 05-124752 proposes a correction mechanism (lateral registration correction mechanism) that corrects a lateral misalignment. In particular, Japanese Patent Laid-Open No. 05-124752 proposes a technique of detecting the position of a lateral edge of a recording sheet using a line sensor provided in the conveyance path, and shifting a roller in the lateral direction so that the position of the lateral edge is aligned with a predetermined position. Here, the lateral edge refers to one of the four sides of a rectangular recording sheet that is parallel to the conveyance direction, i.e., an edge portion in the lateral direction of the sheet.

To accurately align the lateral edge with a predetermined position, it is necessary to accurately detect the position of the lateral edge. Japanese Patent Laid-Open No. 2004-25579 describes a technique of detecting a change of the level of an output signal from a comparator from an output level caused by reflected light from a surface of a recording sheet to an output level caused by reflected light from the black surface of the conveyance guide and thereby detecting the position of the lateral edge.

Japanese Patent Laid-Open No. 2004-25579 does not describe how the threshold of the comparator is determined. The present inventor considers that the threshold should be set to a middle level between the output level (light level) caused by reflected light from a surface of a recording sheet and the output level (dark level) caused by reflected light from the black surface of the conveyance guide. This is because of several reasons. A recording sheet may have an undulated surface during conveyance. As a result, the recording sheet surface may deviate from the position of the focal point of the line sensor for detecting the lateral edge position. In this case, the change from the light level to the dark level is not steep, but rather moderate. Thus, a signal having an intermediate level between the light and dark levels is output over a relatively long interval, and therefore, the lateral edge position is likely to be incorrectly detected. Therefore, it is necessary to set the comparator threshold to the exact middle level between the light and dark levels.

On the other hand, the reflection or transmission characteristics (sheet type) of the recording sheet surface often vary among brands of the recording sheet. For example, plain paper and recycled paper have significantly different optical densities of the surface. In other words, the light level varies depending on the sheet type. Therefore, it is necessary to set the threshold, depending on the sheet type or the light level actually measured.

Note that when the light level is measured, it is necessary to take into consideration variations in the sensitivity of a plurality of light receiving elements included in the line sensor. In other words, the plurality of light receiving elements do not necessarily output the same level of a signal in response to the same amount of incident light. For example, it is assumed that while a light receiving element having a high sensitivity is actually used to detect the lateral edge position, the threshold is determined with reference to the light and dark levels of a light receiving element having a low sensitivity. The light level of the high-sensitive light receiving element is higher than that of the low-sensitive light receiving element. Therefore, the threshold is set to be lower than the middle value between the light and dark levels of the high-sensitive light receiving element, so that the accuracy of detection of the lateral edge position decreases. Therefore, it is necessary to determine the threshold based on the light and dark levels of a light receiving element that actually detects the lateral edge position.

SUMMARY OF THE INVENTION

Therefore, it is a feature of the present invention to determine a threshold for detecting the lateral edge position of a sheet based on the light and dark levels of an element that actually detects the lateral edge position of the sheet, thereby improving the accuracy of detection of the lateral edge position.

An embodiment of the present invention provides a position detection device for detecting a position of a sheet, comprising the following elements. A light detection unit is configured to detect reflected light or transmitted light from the sheet, and including a plurality of element blocks arranged in a line, each of the plurality of element blocks including a plurality of reading pixels. A threshold determination unit is configured to determine a threshold based on a signal output from one of the plurality of element blocks that faces a position of a lateral edge of the sheet in a lateral direction perpendicular to a conveyance direction of the sheet. A binarization unit is configured to compare signals output by the plurality of reading pixels included in each of the plurality of element blocks with the threshold determined by the threshold determination unit, to binarize the signals. A position determining unit is configured to determine, as the position of the lateral edge, a position at which the binary signal output by the binarization unit changes.

Further features of the present invention will become apparent from the following description of exemplary embodiments (with reference to the attached drawings).

BRIEF DESCRIPTION OF THE DRAWINGS

FIGS. 8A and 8B are timing charts showing the lateral registration correction.

FIGS. 11A and 11B are timing charts showing the lateral registration correction.

DESCRIPTION OF THE EMBODIMENTS

Preferred embodiments of the present invention will be described in detail hereafter by way of example with reference to the accompanying drawings. Note that the dimensions, materials, shapes, relative arrangements, and the like of components described in the embodiments are not intended to limit the scope of the present invention unless otherwise specified.

First Embodiment

Figure 1:
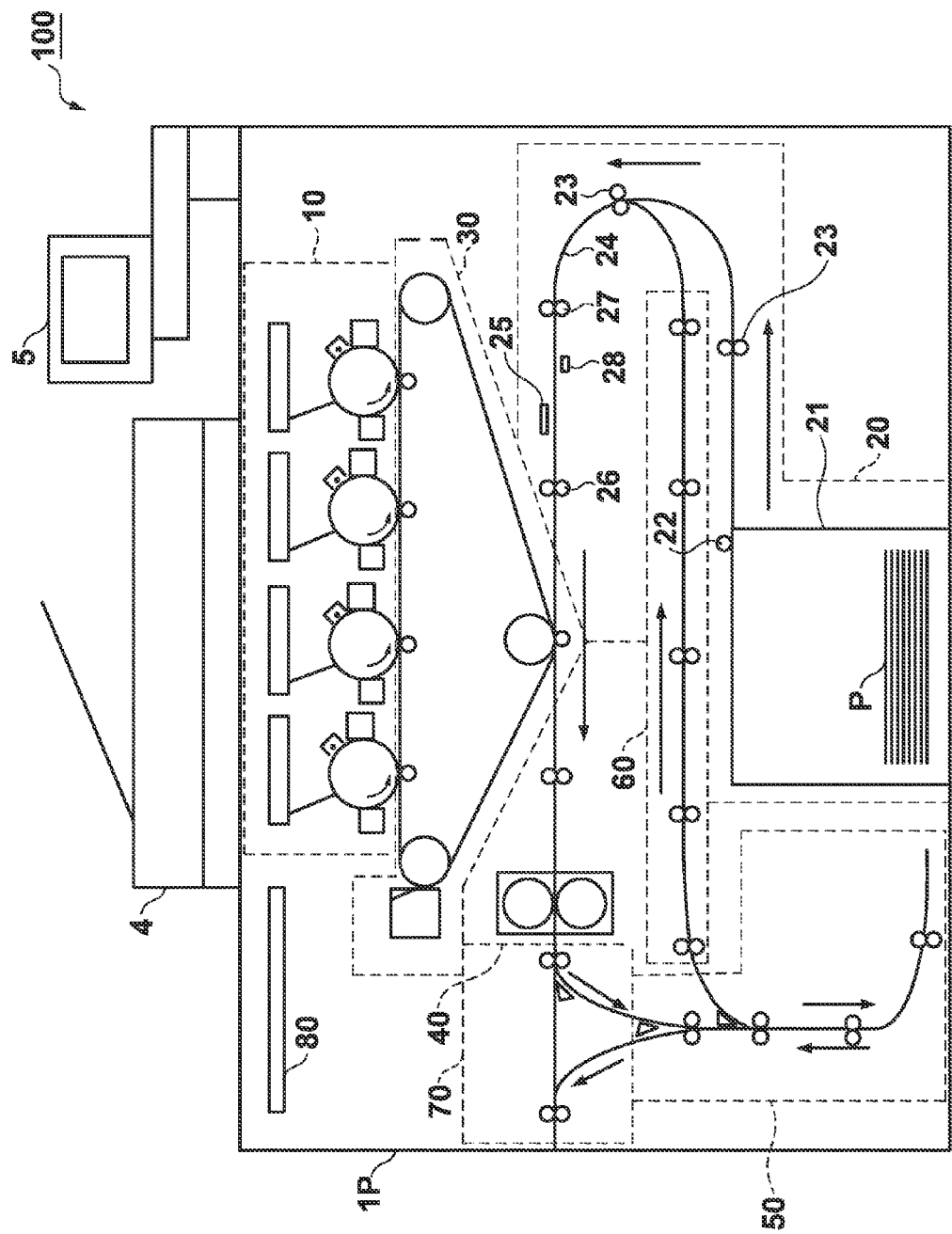
FIG. 1 is a diagram showing a configuration of an image formation device.

In FIG. 1, an image formation device 100 includes a sheet conveyance device including a position detection device according to the present invention. Although the sheet conveyance device for the image formation device 100 is herein described as an example sheet conveyance device, the present invention is applicable to any conveyance devices that need to detect a position of a lateral edge of a sheet. As an example of the image formation device 100, an electrophotographic copier is herein adopted.

Alternatively, the present invention is also applicable to a printer or fax machine for forming color or monochrome images.

An image output unit 1P is a printer engine unit that forms an image of an original acquired by a reader unit 4 on a recording sheet P in accordance with an instruction input from a console unit 5. The image output unit 1P includes an image formation unit 10 that forms a toner image, a conveyance unit 20 that feeds the recording sheet P from a paper feed cassette 21 to a conveyance path, an intermediate transfer unit 30 that transfers the toner image to the recording sheet P, and a fixing unit 40 that fixes the toner image to the recording sheet P. Note that the image output unit 1P may optionally include an inverting double-side unit 50 that inverts (or turns upside down) the recording sheet P in order to perform double-sided printing on the recording sheet P, and a double-side conveyance unit 60 that conveys the inverted recording sheet P. The image output unit 1P further includes a paper discharge unit 70 that discharges the recording sheet P, and a control device 80. The control device 80 is a unit that controls the operation of each unit included in the image formation device 100.

The conveyance unit 20 is a sheet conveyance device that conveys the recording sheet (sheet) P. The recording sheets P accommodated in the paper feed cassette 21 are fed one by one to the conveyance path by a pickup roller 22. The conveyance path includes a conveyance guide 24 that has a black surface having a lower optical density than that of the recording sheet P. In the conveyance path, provided are a plurality of conveyance roller pairs 23 that nip and convey the recording sheet P. A registration roller pair 26 is a pair of rollers that conveys the recording sheet P in accordance with timing of transfer of a toner image. The registration roller pair 26 has the above-described skew correction function and lateral registration correction function. A skew of the recording sheet P is corrected by the leading edge of the recording sheet P abutting the registration roller pair 26 when the registration roller pair 26 is not rotating. In other words, two lateral edges (lateral sides) of the recording sheet P are caused to be parallel to the conveyance direction. Note that the leading edge in the conveyance direction of the recording sheet P may also be referred to as a top edge, and the trailing edge in the conveyance direction of the recording sheet P may also be referred to as a bottom edge. Specifically, the rectangular recording sheet P has four sides: a top edge (top side); a bottom edge (bottom side); and two lateral edges (left and right sides). The positions of the lateral edges of the recording sheet P are corrected to predetermined positions by the registration roller pair 26 moving the recording sheet P in a lateral direction (a direction perpendicular to the conveyance direction) while nipping the recording sheet P.

A conveyance roller pair 27 that can be switched between the engaged and disengaged states, a sheet sensor 28 that detects the presence or absence of the recording sheet P in the conveyance path, and a line sensor 25 that detects the position of a lateral edge of the recording sheet P, are provided in the conveyance path between the conveyance roller pair 23 and the registration roller pair 26. The line sensor 25 is an example light detection unit that includes a plurality of pixel blocks (hereinafter referred to as element blocks) arranged in a line (each block including a plurality of reading pixels), and detects reflected or transmitted light from the recording sheet P. The conveyance roller pair 27 is switched to the engaged state to nip the recording sheet P, and conveys the recording sheet P. On the other hand, in order to correct the position of the lateral edge of the recording sheet P, the conveyance roller pair 27 is switched to the disengaged state to release the recording sheet P.

The fixing unit 40 fixes to the recording sheet P a toner image transferred to the recording sheet P. The paper discharge unit 70 discharges the recording sheet P, to which the toner image has been fixed, from the image formation device 100. The inverting double-side unit 50 pulls into itself the recording sheet P having an image formed on a surface thereof, and outputs the recording sheet P to the double-side conveyance unit 60, thereby inverting (or turning upside down) the recording sheet P. The double-side conveyance unit 60 conveys the recording sheet P to the conveyance path. The skew correction and lateral registration correction are also performed on the recording sheet P conveyed by the double-side conveyance unit 60.

Figure 2A:
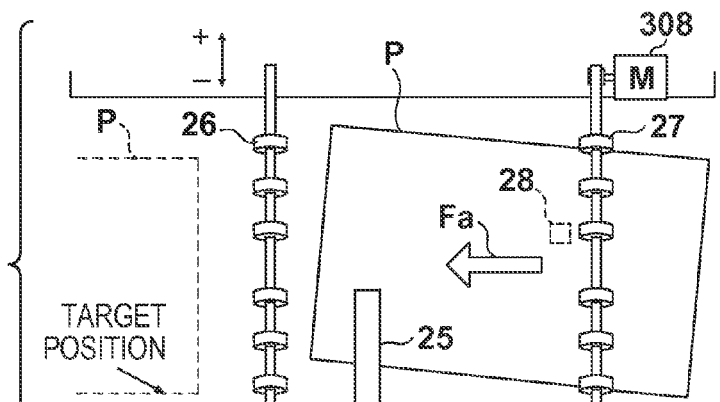
FIGS. 2A to 2C are diagrams showing an operation of a registration unit used in skew correction and lateral registration correction.

The skew correction and lateral registration correction will be described in detail with reference to FIGS. 2A to 2C. In FIG. 2A, the registration roller pair 26 is driven and rotated by a registration drive motor 305. The registration roller pair 26 is also driven by a shift motor 306 to move in a lateral direction Fb perpendicular to a conveyance direction Fa. The conveyance roller pair 27 is driven and rotated by a conveyance motor 307. The conveyance roller pair 27 is driven by a disengagement motor 308 to close and open two rollers included in the conveyance roller pair 27. Instead of the term "open" with respect to the conveyance roller pair 27, the term "disengage" or "separate" may be used.

As shown in FIG. 2A, the recording sheet P is conveyed in the conveyance path by rotation of the conveyance roller pair 27. When the recording sheet P arrives at the registration roller pair 26, the registration roller pair 26 is not rotating. After the recording sheet P abuts the registration roller pair 26, that is not rotating, the conveyance roller pair 27 is allowed to continue to rotate, so that the recording sheet P bends as indicated by a dashed line in FIG. 2B. In this state, the leading edge of the recording sheet P is pressed in the conveyance direction Fa due to the stiffness of the bent recording sheet P while abutting the registration roller pair 26. As a result, the skew of the recording sheet P is corrected at the leading edge (forward edge) of the recording sheet P.

Figure 2B:
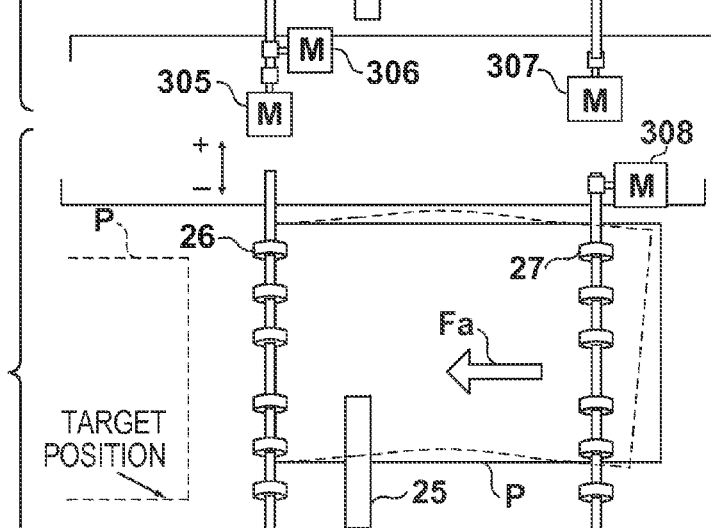

On the other hand, as shown in FIG. 2B, the trailing edge of the recording sheet P remains nipped by the conveyance roller pair 27, and therefore, the trailing edge of the recording sheet P remains skewed. In this state, if the conveyance roller pair 27 is disengaged, no roller pair nips the recording sheet P. To avoid this, the registration roller pair 26 is rotated before the conveyance roller pair 27 is disengaged. Thereafter, after the registration roller pair 26 nips the recording sheet P, the conveyance roller pair 27 is disengaged. As shown in FIG. 2C, when the conveyance roller pair 27 is disengaged, the skew of the entire recording sheet P is corrected.

Figure 2C:
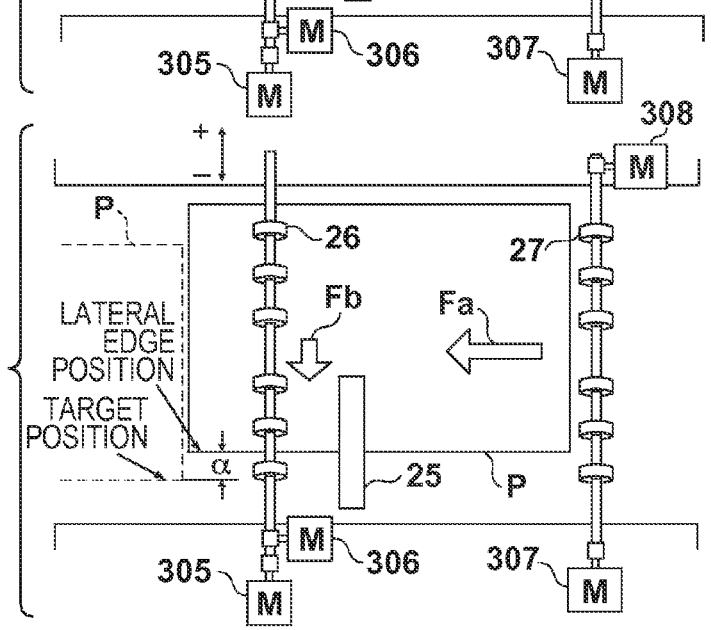

As shown in FIG. 2C, the position of the lateral edge of the recording sheet P, whose skew has been corrected, is detected by the line sensor 25. A longitudinal direction of the line sensor 25 is perpendicular to the conveyance direction Fa. By the detection of the lateral edge position of the recording sheet P by the line sensor 25, the magnitude of a misalignment of the lateral edge with respect to the target position is obtained. Thereafter, the registration roller pair 26 is translated in the lateral direction Fb so that the magnitude of the misalignment becomes zero. Note that, as shown in FIGS. 2A to 2C, directions in which the registration roller pair 26 is shifted for the lateral registration correction are indicated by "+" and "−". The "+" direction is a rightward direction as viewed from the upstream side to the downstream side in the conveyance direction of the recording sheet P. The "−" direction is a leftward direction as viewed from the upstream side to the downstream side in the conveyance direction of the recording sheet P.

A relationship between the recording sheet P and the line sensor 25 as viewed from the downstream side to the upstream side of the recording sheet P, and a level of an output signal "out" output from the line sensor 25, will be described with reference to FIG. 3. In a graph showing the level of the output signal "out," the vertical axis represents voltages, and the horizontal axis represents numbers (Nos.) of pixels included in the line sensor 25, where the leftmost pixel's No. is "1". The line sensor 25 outputs a time series of voltages of pixels (the output signal "out"), and therefore, the horizontal axis also represents time.

The line sensor 25 includes a plurality of element blocks Ea to Ee. The element blocks Ea to Ee each include a plurality of pixels. Each pixel is a light receiving element (photoelectric conversion element). The pixels are given numbers (Nos.) that increase from the left end to the right end in FIG. 3. Light emitted from a light emitting element (light source), such as an LED or the like, is reflected by the recording sheet P or the conveyance guide 24 before entering the line sensor 25. The reflected light from the recording sheet P or the conveyance guide 24 is brought to each of the pixels of the line sensor 25 by a SELFOC (registered trademark) lens array (imaging lens) 312. Ambient scattered light as well as the reflected light enter SELFOC lenses included in the SELFOC lens array 312 from directly below. The recording sheet P is conveyed toward the viewer in FIG. 3.

Here, in FIG. 3, it is assumed that the lateral edge of the recording sheet P passes below the element block Ed. In FIG. 3, as indicated by a pixel No. [pxl]-vs-level [V] graph, when the recording sheet P is present below the element block, the signal level of the element block is high. On the other hand, when the recording sheet P is not present below the element block, the signal level of the element block is low.

Here, the sensitivity varies from element block to element block. Therefore, even when the element blocks Ea to Ee receive uniform reflected light from the recording sheet P having uniform reflection characteristics of the surface, the element blocks Ea to Ee have varying output levels. In FIG. 3, the element blocks Ea to Ee have varying largest and smallest values of the output level. The largest and smallest values of the output level of the element block Ed located at a position corresponding to the lateral edge position are Vhd and Vld, respectively. The variations in the level of the element blocks are caused due to, for example, manufacturing variations of semiconductor wafers that are to be diced into element blocks. On the other hand, variations in the sensitivity of a plurality of pixels in each element block are relatively small compared to the variations among the element blocks. This is because a plurality of pixels included in the same element block are manufactured from the same wafer. Therefore, the variations among the pixels can be ignored.

Figure 4:
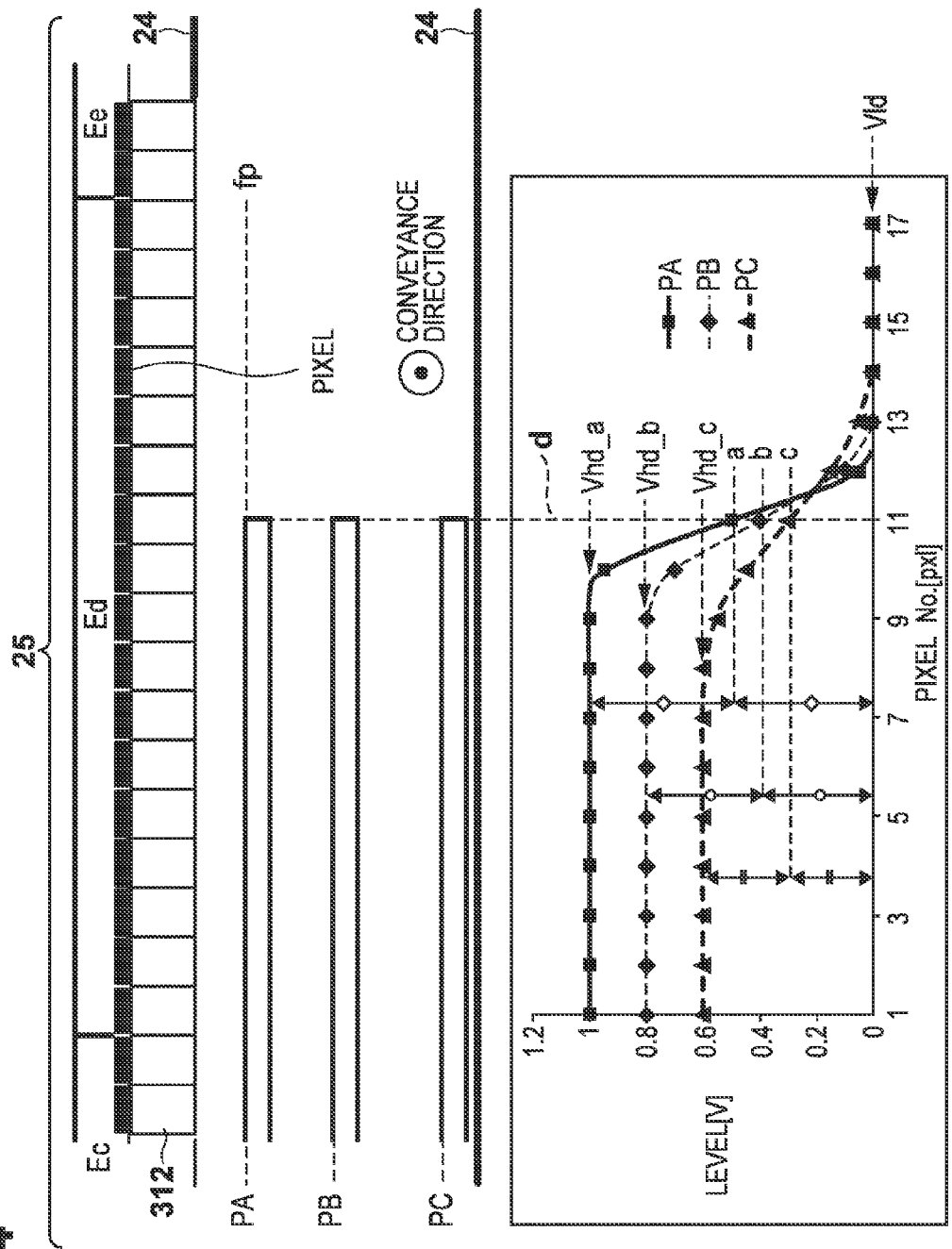
FIG. 4 is a diagram for describing a threshold determination method.

A method of determining the threshold for detecting the lateral edge position will be described with reference to FIG. 4. FIG. 4 shows an enlarged view of the element block Ed. The element block Ed includes 17 pixels, where the leftmost pixel's No. is 1 and the rightmost pixel's No. is 17. FIG. 4 shows three positions PA to PC of a surface of the recording sheet P. Reference character fp indicates the position of a focal point of the SELFOC lens array 312. FIG. 4 also shows a pixel No. [pxl]-vs-output level [V] graph depending on the difference in the surface of the recording sheet P. In the graph, the output levels corresponding to the positions PA to PC are normalized, where the output level that is acquired when the recording sheet P is located at the position PA is one.

As can be seen from the graph, the change in the output level becomes more moderate with an increase in the distance between the position of the surface of the recording sheet P and the focal point position fp. In the graph of FIG. 4, a dashed line "a" indicates a middle value between an output level Vhd_a corresponding to the amount of reflected light from the recording sheet P, which is located at the position PA, and the output level Vld corresponding to the amount of reflected light from the conveyance guide 24. Similarly, a dashed line "b" indicates a middle value between an output level Vhd_b corresponding to the amount of reflected light from the recording sheet P, which is located at the position PB, and the output level Vld corresponding to the amount of reflected light from the conveyance guide 24. A dashed line "c" indicates a middle value between an output level Vhd_c corresponding to the amount of reflected light from the recording sheet P, which is located at the position PC, and the output level Vld corresponding to the amount of reflected light from the conveyance guide 24. A dashed line "d" extending in the vertical direction indicates the position of the lateral edge of the recording sheet P.

As can be seen from FIG. 4, the points where the dashed line "d" intersects the output levels have the middle values "a" to "c" between the output levels (the light levels Vhd_a to Vhd_c) corresponding to the amounts of reflected light from the recording sheet P and the output level (dark level Vld) corresponding to the amount of reflected light from the conveyance guide 24. Therefore, even when the position of the recording sheet P varies, then if the middle value between the light level Vh and the dark level Vl at that time is determined as the threshold Vth, the position of the lateral edge of the recording sheet P can be detected with higher accuracy.

Figure 5:
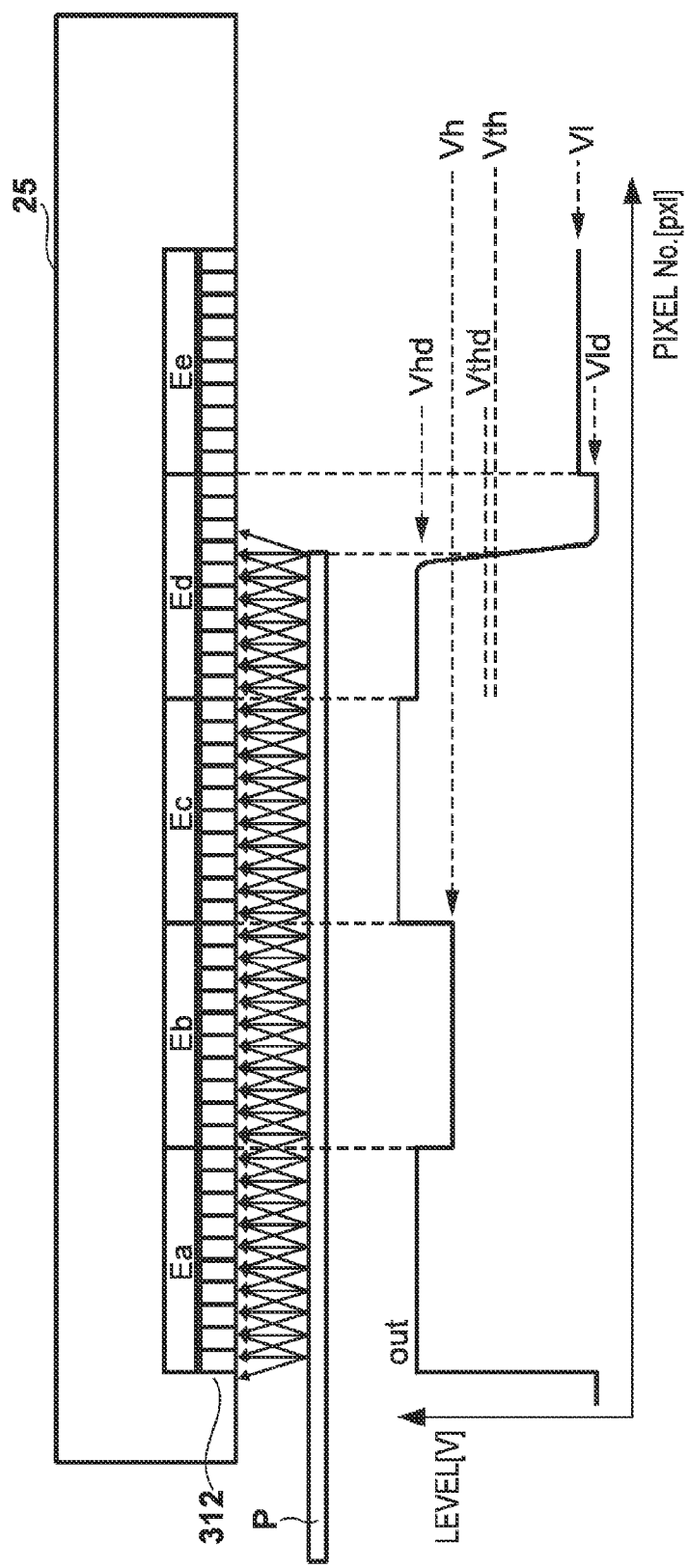
FIG. 5 is a diagram for describing a comparative example threshold determination method.

A comparative example method of determining the threshold Vth will be described with reference to FIG. 5. In FIG. 5, a light level Vh is the smallest value of the output levels of pixels detecting reflected light from the recording sheet P, of the output levels of the pixels in the element blocks Ea to Ee. In FIG. 5, the output level of each pixel of the element block Eb has the smallest value of the output levels of the pixels detecting reflected light from the recording sheet P. Therefore, the light level Vh is set to this output level. The dark level Vl is set to the largest value of the output levels of pixels not detecting reflected light from the recording sheet P (i.e., pixels detecting reflected light from the conveyance guide 24). In FIG. 5, a portion of the pixels included in the element block Ed and all the pixels included in the element block Ee are detecting reflected light from the conveyance guide 24. The output level of each pixel of the element block Ee is higher than the output level of those detecting reflected light from the conveyance guide 24 of the pixels included in the element block Ed. Therefore, the dark level Vl is set to the output level of the pixels of the element block Ee. As shown in FIG. 5, the threshold Vth is set to a middle value between the light level Vh and the dark level Vl. The threshold Vth is slightly different from a threshold Vthd that is a middle value between the largest value Vhd and the smallest value Vld of the output levels of the element block Ed, and therefore, the detected lateral edge position has an error corresponding to about one pixel.

Figure 3:
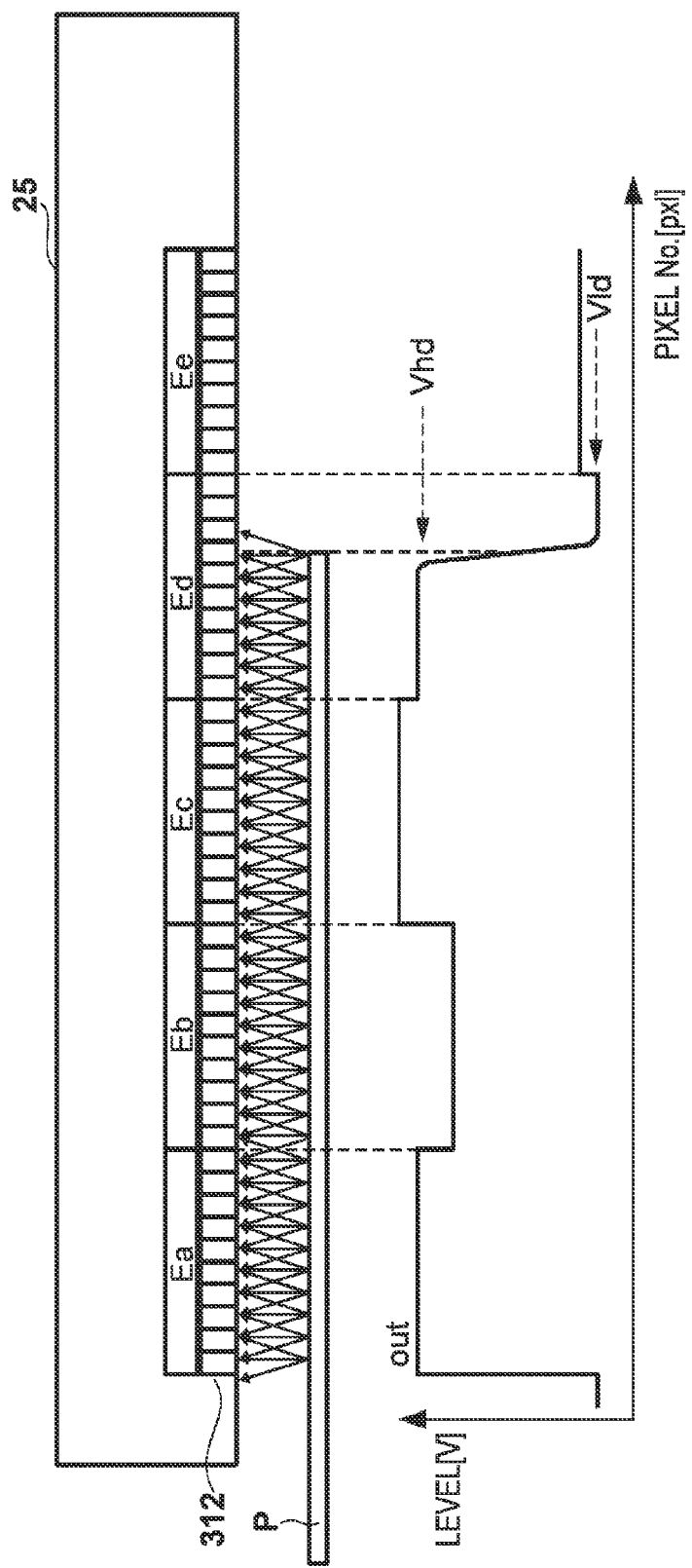
FIG. 3 is a diagram showing example output levels of a line sensor.

As can be seen from comparison between the threshold determination method of this embodiment of FIG. 3 and the comparative example threshold determination method of FIG. 5, the lateral edge position can be more accurately detected by the threshold determination method of this embodiment. Thus, in terms of the accuracy of the lateral edge position, it is advantageous to determine the threshold Vthd based on the largest value Vhd and the smallest value Vld of the output levels of the pixels included in the element block Ed that actually detects the lateral edge position. An expression for calculating the threshold Vthd of this embodiment is described below. As can be seen from the expression below, the threshold Vthd is acquired as a middle value (the average value in this embodiment) between the largest value Vhd and the smallest value Vld.

$$Vthd = (Vhd + Vld)/2$$

As shown in FIG. 4, even if the change in the output levels of a plurality of pixels located in the vicinity of the position of the lateral edge of the recording sheet P is not steep, but rather moderate, the lateral edge position can be more accurately detected in this embodiment. As shown in FIG. 2C, a distance α between the detected lateral edge position of the recording sheet P and a target lateral edge position is calculated. Thereafter, the registration roller pair 26 is shifted in the lateral direction Fb by the distance α so that the position of the lateral edge of the recording sheet P is aligned with the target position.

Figure 6:
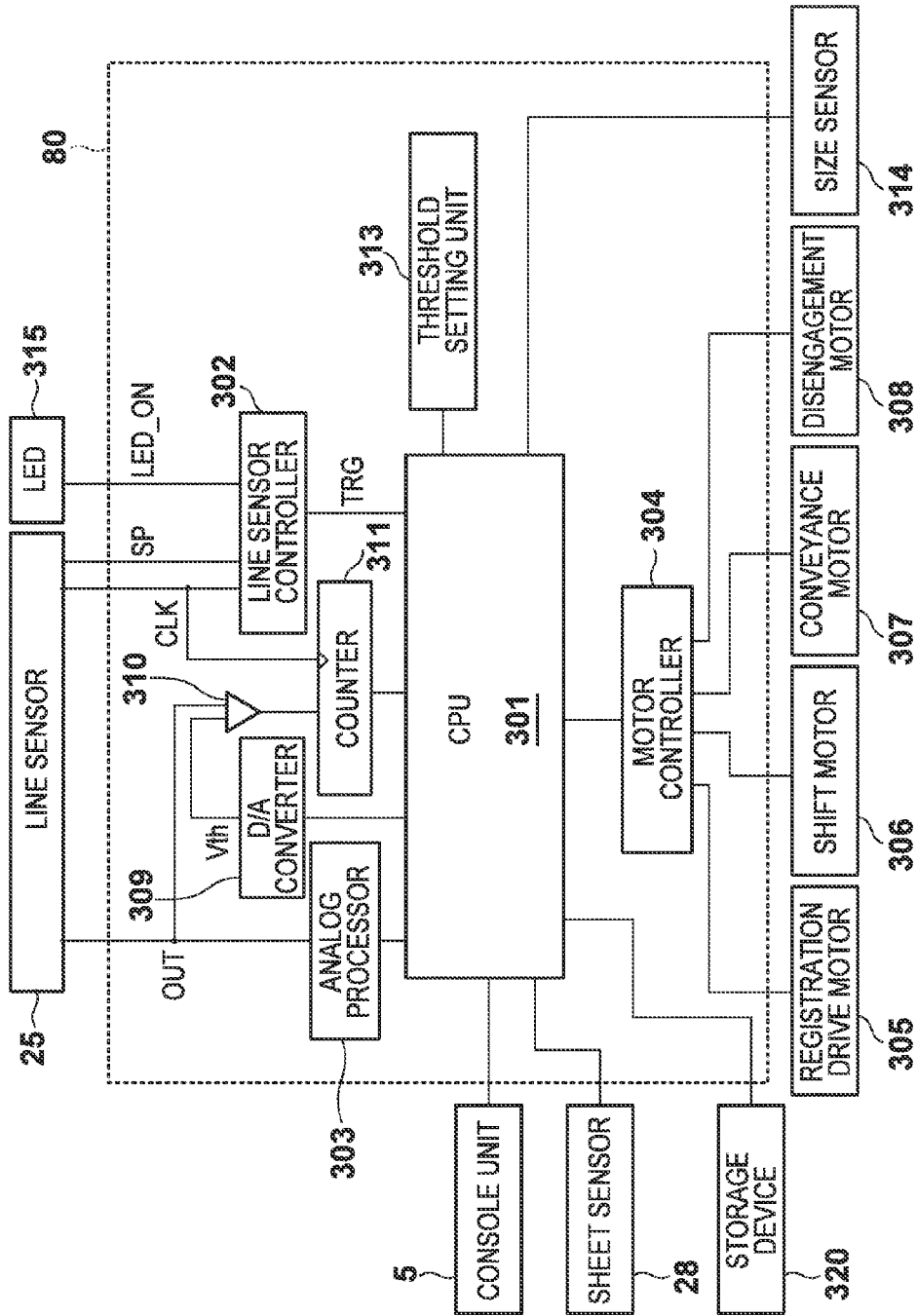
FIG. 6 is a block diagram for describing a controller involved in the lateral registration correction.

Operations of units involved in the skew correction and lateral registration correction will be described with reference to FIG. 6. A CPU 301 acquires instructions from an input device of the console unit 5, and displays information on a display device of the console unit 5. The CPU 301 acquires size information indicating a size (e.g., A4, A4R, etc.) of the recording sheet P from the console unit 5 or a size sensor 314. The size sensor 314 is provided in the conveyance path or the paper feed cassette 21 to detect the size of the recording sheet P. When the sheet sensor 28 outputs a detection signal, the CPU 301 recognizes that the leading edge of the recording sheet P has arrived at the sheet sensor 28. The CPU 301 stops rotation of the conveyance motor 307 or starts the skew correction and lateral registration correction with reference to a timing when the leading edge of the recording sheet P arrives at the sheet sensor 28.

The CPU 301 uses the motor controller 304 to control the conveyance motor 307 that rotates the conveyance roller pair 27, and the disengagement motor 308 that disengages the conveyance roller pair 27 to allow the registration roller pair 26 to be shifted. The CPU 301 determines a shift amount (the distance a) that is to be used in lateral registration correction, and uses the motor controller 304 to resume rotation of the registration drive motor 305 at a timing when rotation of the registration roller pair 26 is resumed. The CPU 301 also uses the motor controller 304 to drive the shift motor 306 so that the recording sheet P is shifted in the lateral direction by the distance a.

The CPU 301 uses the line sensor 25 to determine the position of the lateral edge of the recording sheet P. When driving the line sensor 25, the CPU 301 outputs a trigger signal TRG to a line sensor controller 302. The line sensor controller 302, when receiving the trigger signal TRG, outputs to the line sensor 25 a control signal required to drive the line sensor 25. The control signal includes a clock signal CLK, a start pulse SP, a LED ON signal LED_ON for turning on an LED 315 connected to the line sensor 25, and the like. The line sensor 25, when receiving the clock signal CLK and the start pulse SP, successively reads signals output from the pixels of the element blocks Ea to Ee to output a time-series output signal OUT. The output signal OUT, which is an analog signal, is input to an analog processor 303 and a comparator 310. The analog processor 303 converts the output signal OUT (analog signal) to a digital signal, and outputs the digital signal to the CPU 301. The CPU 301 designates an element block that is to detect the lateral edge position, based on the size information acquired from the size sensor 314 or the console unit 5. The CPU 301 also extracts, from the output signal OUT, output signals output from the designated element block. The CPU 301 outputs the extracted output signals to a threshold setting unit 313. The threshold setting unit 313 compares the levels of the output signals to determine the largest and smallest values and thereby determine the middle value between the largest and smallest values as the threshold Vth, and outputs the threshold Vth to the CPU 301. The threshold setting unit 313 may be included in the CPU 301, or may be a function achieved by the CPU 301 executing a program stored in a storage device 320. The CPU 301 outputs the threshold Vth to a D/A converter 309. The D/A converter 309 outputs a voltage corresponding to the threshold Vth to the comparator 310. The comparator 310 compares the output signal OUT with the threshold Vth to perform binarization. Thus, the comparator 310 compares signals output by a plurality of pixels of each one of a plurality of element blocks included in the line sensor 25 with the threshold determined by the threshold setting unit 313, thereby functioning as a binarization unit that binarizes the signals. The comparator 310 outputs a high-level signal if the output signal OUT exceeds the threshold Vth, and a low-level signal otherwise. A counter 311 is operated based on the clock signal CLK output from the line sensor controller 302. The counter 311 measures a period of time (i.e., counts high-level binary signals) based on the clock signal CLK, and outputs the time period (count value) to the CPU 301. The CPU 301 determines the position of the lateral edge of the recording sheet P based on the count value. The CPU 301 also calculates a magnitude and direction of a misalignment of the lateral edge position with respect to the target position. The CPU 301 converts the magnitude of the misalignment to the number of pulses for the shift motor 306, and outputs the number of pulses, and data indicating a drive direction in which the shift motor 306 is to be driven, to the motor controller 304. The motor controller 304 drives the shift motor 306 based on the drive direction and the number of pulses.

Figure 7:
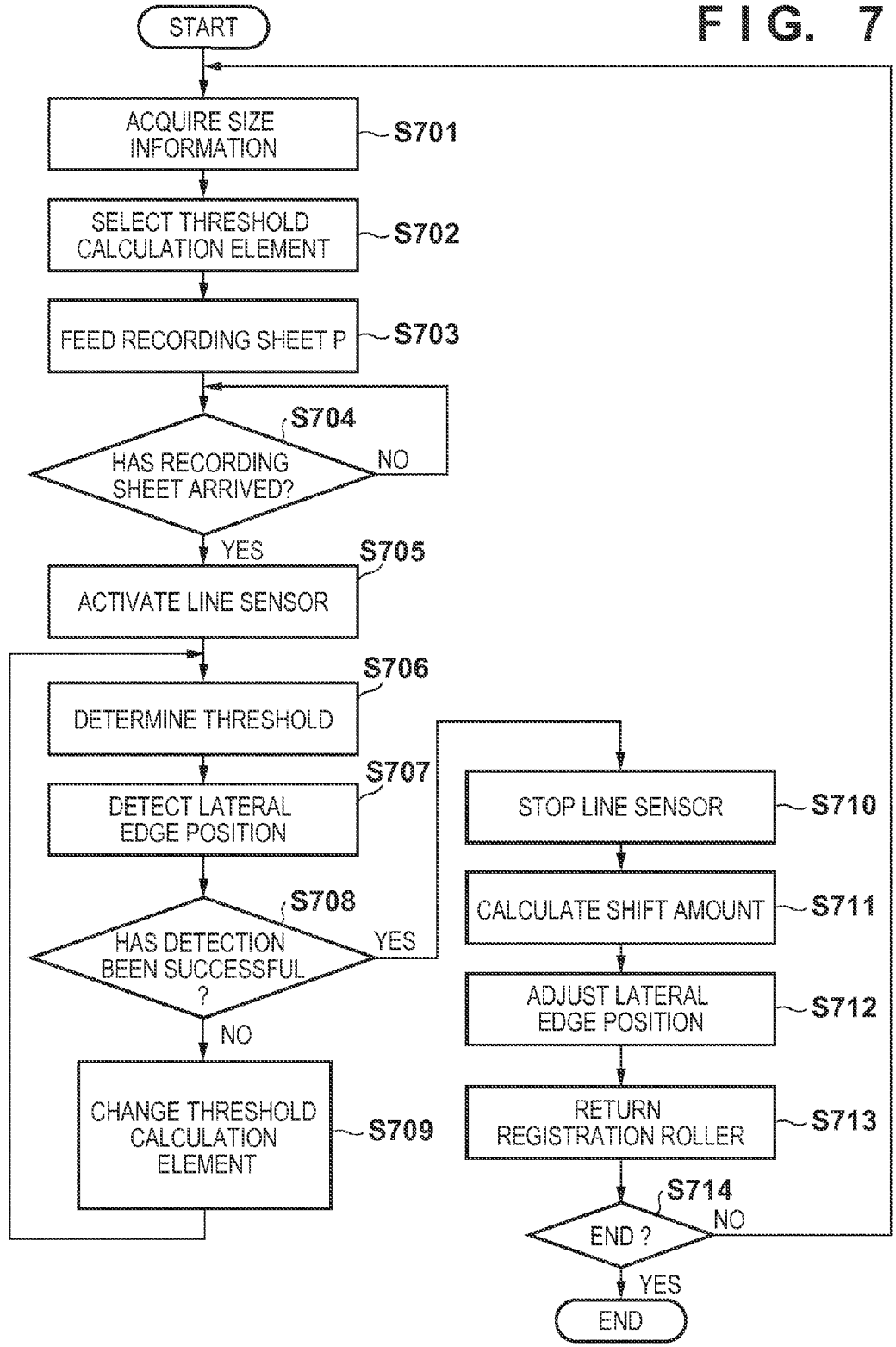
FIG. 7 is a flowchart showing the lateral registration correction including the threshold determination method.

The lateral registration correction performed by the CPU 301 will be described with reference to FIG. 7.

In S701, the CPU 301 acquires size information indicating the size (e.g., A4, A4R, etc.) of the recording sheet P from the console unit 5 or the size sensor 314. Thus, the console unit 5 or the size sensor 314 is an example acquiring unit that acquires size information indicating the size of a sheet.

In S702, the CPU 301 selects an element block (threshold calculation element) that is to be used in threshold calculation from the element blocks included in the line sensor 25 based on the size information. Because the recording sheet P is conveyed at substantially the middle in the lateral direction of the conveyance path, if the size of the recording sheet P is known, it is basically known which of the element blocks detects the lateral edge position. Therefore, it is assumed that the storage device 320 stores a previously obtained corresponding relationship (a table, a function, data, etc.) between the positions of the element blocks included in the line sensor 25 and the size of the recording sheet P. The CPU 301 references the correspondence relationship stored in the storage device 320 to extract the number (No.) of an element block matching the size information. Note that it is assumed that the threshold calculation element is previously determined, taking into consideration the maximum magnitude of a misalignment due to conveyance variations with respect to the nominal (target) position of the lateral edge of the recording sheet P in the conveyance path. For example, when the lateral edge position has the maximum magnitude of a misalignment, then if the element block that detects the lateral edge position is the element block Ed, the threshold calculation element is the element block Ed. Thus, the CPU 301 functions as an element selection unit that selects an element block corresponding to the size information from the element blocks included in the line sensor 25 based on the previously obtained correspondence relationship between the positions of the element blocks and sheet sizes.

In S703, the CPU 301 instructs the motor controller 304 to start rotation of the pickup roller 22, conveyance roller pair 23, and the conveyance roller pair 27, whereby the recording sheet P is fed to the conveyance path.

In S704, it is determined whether or not the recording sheet P has arrived at a position below (facing) the line sensor 25. For example, if a predetermined period of time has elapsed since a timing of detection of the leading edge of the recording sheet P by the sheet sensor 28, the CPU 301 determines that the recording sheet P has arrived at a position below the line sensor 25. The predetermined period of time is obtained based on a conveyance speed of the recording sheet P and a conveyance distance between the sheet sensor 28 and the line sensor 25. When the recording sheet P has arrived at a position below the line sensor 25, control proceeds to S705.

In S705, the CPU 301 instructs the line sensor controller 302 to activate the line sensor 25. In accordance with the instruction, the line sensor controller 302 outputs the clock signal CLK and the start pulse SP to the line sensor 25, and outputs the LED ON signal LED_ON to the LED 315. The line sensor 25 starts outputting the analog output signal OUT based on the clock signal CLK.

In S706, the CPU 301 transfers the output signals of the pixels in the element block selected in S702 to the threshold setting unit 313 to determine the threshold Vth. For example, the threshold setting unit 313 determines, as the threshold Vth, the middle value between the largest and smallest values of the levels of the output signals of the pixels. The comparator 310 compares the level of the output signal OUT output by the line sensor 25 with the set threshold Vth to binarize the output signal OUT, and outputs the resulting binary signal. The output signal OUT output by the line sensor 25 includes not only the output signals of the threshold calculation element, but also signals output by all pixels of the element blocks Ea to Ee included in the line sensor 25. The CPU 301 outputs data indicating the threshold Vth to the D/A converter 309 to set the threshold Vth into the comparator 310. Thus, the CPU 301 and the threshold setting unit 313 function as a threshold determination unit that determines, as the threshold, the middle value between the largest and smallest values of the levels of signals output from one of the element blocks that faces the lateral edge position in the lateral direction of a sheet.

In S707, the CPU 301 detects the lateral edge position based on the count value of the counter 311. As described above, the counter 311 counts the clock signals CLK to measure a period of time during which the level of the output signal OUT exceeds the threshold Vth. There is a one-to-one correspondence between the time periods and the lateral edge positions. It is assumed that the correspondence relationship (e.g., a table, a function, data, etc.) between the time periods (count values) and the lateral edge positions is previously stored in the storage device 320. Specifically, the counter 311 stops counting at a position at which the binary signal output by the comparator 310 changes from the high level to the low level (or from the low level to the high level). The count value indicates the lateral edge position. Thus, the CPU 301 functions as a position determining unit.

In S708, the CPU 301 determines whether or not the lateral edge position has been successfully detected. For example, the CPU 301 determines whether or not the lateral edge position detected in S707 coincides with the position of the threshold calculation element selected in S702. It is assumed that information indicating the positions of the element blocks included in the line sensor 25 is previously stored in the storage device 320. If the element block corresponding to the lateral edge position does not match the threshold calculation element, the CPU 301 determines that the lateral edge position has not been successfully detected, and control proceeds to S709. On the other hand, if the CPU 301 determines that the lateral edge position has been successfully detected, control proceeds to S710.

In S709, the CPU 301 switches the threshold calculation element to an element block corresponding to the lateral edge position (reselects as the threshold calculation element an element block corresponding to the lateral edge position), and control returns to S706. Thus, the CPU 301, when failing to determine the lateral edge position, reselects another one from the element blocks. In S706, the CPU 301 redetermines a threshold based on the levels of output signals of the pixels included in the reselected element block. Thus, the CPU 301 and the threshold setting unit 313 redetermine, as a threshold, the middle value between the largest and smallest values of the levels of signals output from the pixels included in another element block. The threshold determination method is as described above. In S707, the CPU 301 detects the lateral edge position using the redetermined threshold. If, in S708, the CPU 301 determines that the lateral edge position has been successfully detected, control proceeds to S710.

In S710, the CPU 301 instructs the line sensor controller 302 to stop the line sensor 25. The line sensor controller 302 stops outputting the clock signal CLK, the start pulse SP, and the LED ON signal. As a result, the line sensor 25 is stopped.

In S711, the CPU 301 calculates a difference between the lateral edge position of the recording sheet P finally determined in S707 and the target position, as a shift amount by which the recording sheet P is to be shifted in the lateral direction.

In S712, the CPU 301 adjusts the lateral edge position based on the shift amount. For example, the CPU 301 adjusts the lateral edge position of the recording sheet P by shifting the registration roller pair in the lateral direction while allowing the registration roller pair 26 to nip the recording sheet P. Thus, the registration roller pair 26 functions as a movement unit that, when the determined lateral edge position is misaligned with the predetermined position, moves the recording sheet P in the lateral direction so that the lateral edge position is aligned with the predetermined position. The CPU 301 causes the registration roller pair 26 to rotate so that the recording sheet P is conveyed to a transfer position. When the trailing edge of the recording sheet P has passed through the registration roller pair 26, control proceeds to S713.

In S713, the CPU 301 controls the shift motor 306 to return the registration roller pair 26 to a home position. The home position refers to a middle position in a range within which the registration roller pair 26 can be shifted. In other words, a distance by which the registration roller pair 26 can be moved from the home position in the leftward direction ("−" side) is equal to a distance by which the registration roller pair 26 can be moved from the home position in the rightward direction ("+" side).

In S714, the CPU 301 determines whether or not all printing instructed by the console unit 5 has been completed. If the determination result is positive, the CPU 301 ends the process of this flowchart. On the other hand, if the determination result is negative, the CPU 301 returns to S701, in which the CPU 301 is then caused to be ready for a printing process for the next recording sheet P.

Timings related to the lateral registration correction will be described with reference to FIG. 8A. In FIG. 8A, the "conveyance roller pair drive signal" indicates a signal that the motor controller 304 outputs to drive the conveyance motor 307. The "conveyance roller's open/closed state" indicates whether the conveyance roller pair 27 is in the open state (disengaged state) or the closed state (engaged state). The "sheet sensor detection signal" indicates a signal output by the sheet sensor 28. The detection signal of the sheet sensor 28 is on when the recording sheet P is passing the sheet sensor 28, and off otherwise. The "registration roller drive signal" indicates a signal that the motor controller 304 outputs to drive the registration drive motor 305. The start pulse SP is as described above. The "registration roller shift" indicates a direction in which the registration roller pair 26 is shifted. Specifically, the "registration roller shift" indicates whether the registration roller is moved from the home position HP toward the "+" side (in the rightward direction as viewed from the upstream side to the downstream side in the conveyance direction of the recording sheet P) or toward the "−" side (in the leftward direction as viewed from the upstream side to the downstream side in the conveyance direction of the recording sheet P).

Before the recording sheet P arrives at the conveyance roller pair 27, the CPU 301 turns on the conveyance roller pair drive signal. The sheet sensor 28 is turned on at a timing when the recording sheet P passes. A period of time from when the sheet sensor detection signal is turned on to when the recording sheet P strikes the registration roller pair 26 is represented by t1. A period of time from when the recording sheet P strikes the registration roller pair 26 to when the conveyance roller pair drive signal is turned off is represented by t2. Thus, t2 is a period of time during which the recording sheet P is being bent (warp is formed or increases). A period of time from when the conveyance roller pair drive signal is turned off to when the registration roller drive signal is turned on is represented by t3. Thus, t3 is a period of time during which the recording sheet P is held while remaining bent. When the registration roller drive signal is turned on, the registration roller pair 26 starts nipping the recording sheet P. However, the conveyance roller pair 27 is in the engaged state, and therefore, the quantity of the warp of the recording sheet P gradually decreases. When t4 seconds have elapsed since the registration roller drive signal was turned on, the CPU 301 disengages the conveyance roller pair 27 to remove the warp, thereby correcting the skew of the recording sheet P. When t5 seconds have elapsed since the conveyance roller pair 27 was opened, the CPU 301 starts outputting the start pulse SP to start lateral edge detection using the line sensor 25. At this timing, the conveyance of the recording sheet P becomes stable (the skew correction has been completed, and undulations in the height direction of the recording sheet P are reduced). Thus, t5 is a period of time that is required to stabilize the conveyance of the recording sheet P, and varies depending on the paper density (grammage) of the recording sheet P. The time period t5 can be obtained by an experiment or simulation. When t6 seconds have elapsed since the output of the start pulse SP was started, the CPU 301 starts shifting the registration roller pair 26. It is assumed that t6 is previously determined based on a period of time required to calculate the shift amount. In the example of FIG. 8A, it is assumed that the lateral edge position is misaligned with respect to the target position in the "−" direction. Therefore, the shift direction is the "+" direction. If the shift motor 306 is rotated in the "+" direction for t7 seconds, the lateral edge position of the recording sheet P is shifted to the target position. If the shift motor 306 is rotated in the "−" direction for t8 seconds from a timing when the trailing edge of the recording sheet P has completely passed the registration roller pair 26, the registration roller pair 26 returns to the home position HP.

Operations of the line sensor 25, the CPU 301, and the counter 311 will be described with reference to FIG. 8B. Here, it is assumed that when the recording sheet P is passing below the line sensor 25, the line sensor 25 scans two times to perform the threshold operation and the lateral edge position detection. Note that, in FIG. 8B, the "status" indicates a status of the CPU 301 (indicating whether the threshold calculation or the lateral edge detection is being performed).

When the recording sheet P is conveyed to arrive at a position below the line sensor 25, the CPU 301 outputs the clock signal CLK and the start pulse SP to the line sensor 25. As a result, the time-series output signal OUT in which the output signals of the pixels are arranged sequentially in time is output. Here, in a threshold calculation element region, the CPU 301 performs sampling on the output signal OUT. Specifically, the "sample" shown in FIG. 8B is turned on. As the threshold calculation element, the element block Ed is selected. The CPU 301 determines the threshold Vth based on the largest and smallest values of the levels of the output signals output by the element block Ed, and sets this threshold Vth into the comparator 310. Here, the largest value corresponds to the amount of reflected light from the recording sheet P, and the smallest value corresponds to the amount of reflected light from a region (the conveyance guide 24) outside the recording sheet P.

After setting the threshold Vth, the CPU 301 causes counter 311 to start counting. In FIG. 8B, the "counter" indicates a period of time during which the counter 311 performs counting. The CPU 301 outputs the start pulse SP again to cause the line sensor 25 to output the output signal OUT. The comparator 310 compares the output signal OUT with the threshold Vth to output a binary signal. In FIG. 8B, the "Paper_width" indicates a period of time during which the level of the binary signal is high. This time period is data indicating the lateral edge position of the recording sheet P and is measured by the counter 311.

Thus, according to the first embodiment, the threshold is determined using an element block that actually detects the lateral edge position. Therefore, the threshold can be more accurately determined and the lateral edge position can be more accurately determined than in the conventional art. In particular, in this embodiment, an element block is selected based on the size information of the recording sheet P, and a more appropriate threshold can be determined based on the selected element block. Therefore, the lateral edge position can be more accurately determined. In particular, an element block that is to detect the lateral edge position is designated based on the size information, and the threshold is determined based on the output signal of that element block. Therefore, the threshold can be more accurately determined. For example, the threshold is set to the middle value between the largest and smallest values of the levels of signals output from an element block that actually detects the lateral edge position. Note that the largest value is the level of a signal output from one of a plurality of pixels included in an element block selected by the CPU 301 that has detected reflected light or transmitted light from the recording sheet P. The smallest value is the level of a signal output from one of the plurality of pixels included in the element block selected by the CPU 301 that has not detected reflected light or transmitted light from the recording sheet P. Thus, if the threshold is set to the middle value between the largest and smallest values of the output levels of an element block that actually detects the lateral edge position, the accuracy of detection of the lateral edge position is particularly improved.

Second Embodiment

In the first embodiment, an element block that is used to determine the threshold is selected based on the size information of the recording sheet P, and the threshold is determined using that element block. In a second embodiment, a first threshold as a temporary threshold is determined based on a sheet type (surface reflection characteristics) of the recording sheet P, and a second threshold as a true threshold is determined based on a binary signal that is acquired based on the temporary threshold. Note that, for simplicity of description, details that have been described in the first embodiment will not be described.

Figure 9:
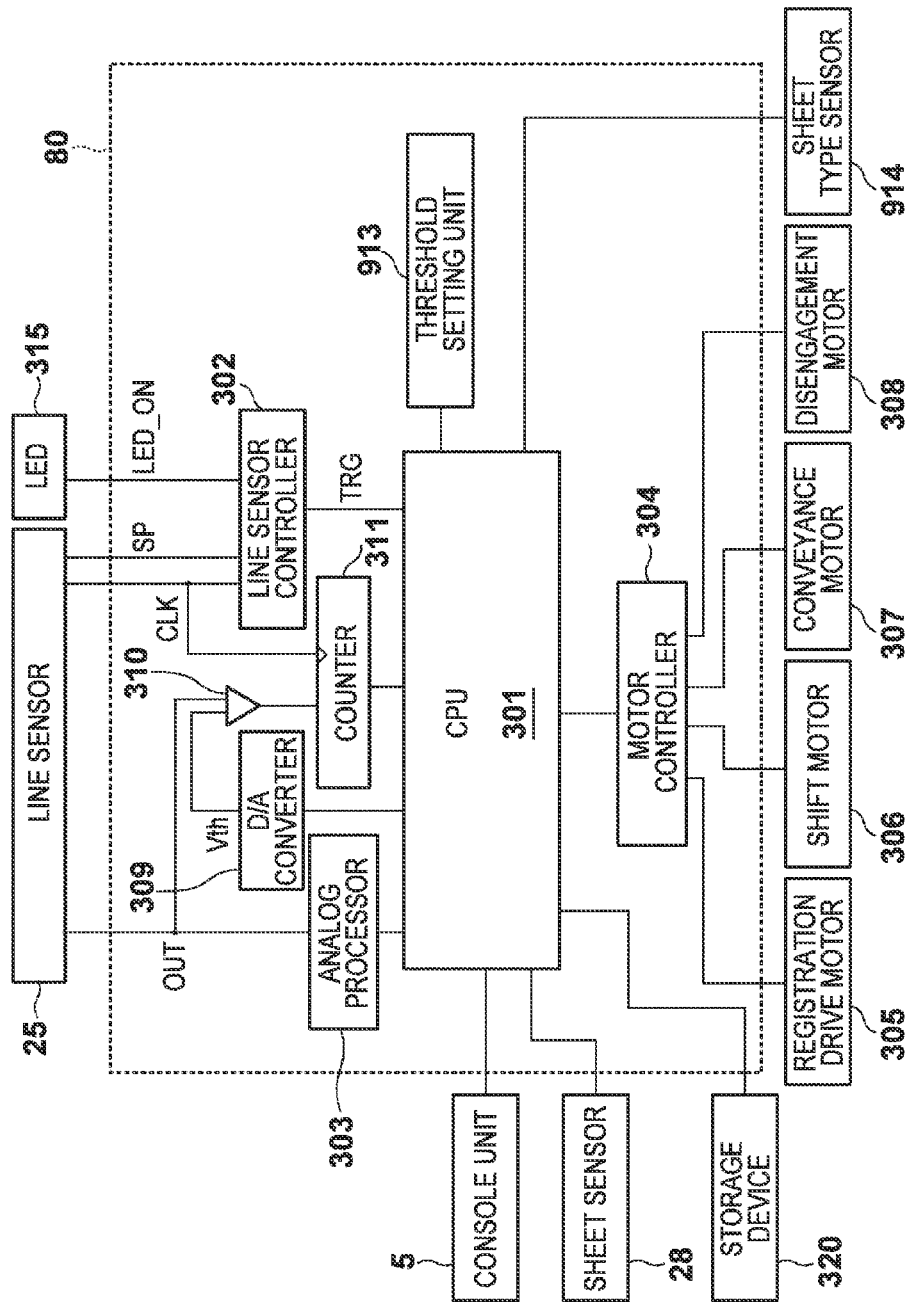
FIG. 9 is a block diagram for describing a controller involved in lateral registration correction.

Operations of units involved in the skew correction and lateral registration correction will be described with reference to FIG. 9. Components described above are indicated by the same reference characters. As compared to FIG. 3, in FIG. 6 a sheet type sensor 914 that detects the sheet type is employed instead of the size sensor 314, and a threshold setting unit 913 is employed instead of the threshold setting unit 313. The threshold setting unit 913 selects the temporary threshold based on the sheet type that is detected by the sheet type sensor 914 or the sheet type that is designated by the console unit 5. The threshold setting unit 913 also compares the levels of the output signals from the element block determined based on the temporary threshold to determine the largest and smallest values, and determines the middle value between the largest and smallest values as the threshold Vth. Note that the operation of the line sensor 25 that scans the surface of the recording sheet P based on the temporary threshold is referred to as "prescanning."

Figure 10:
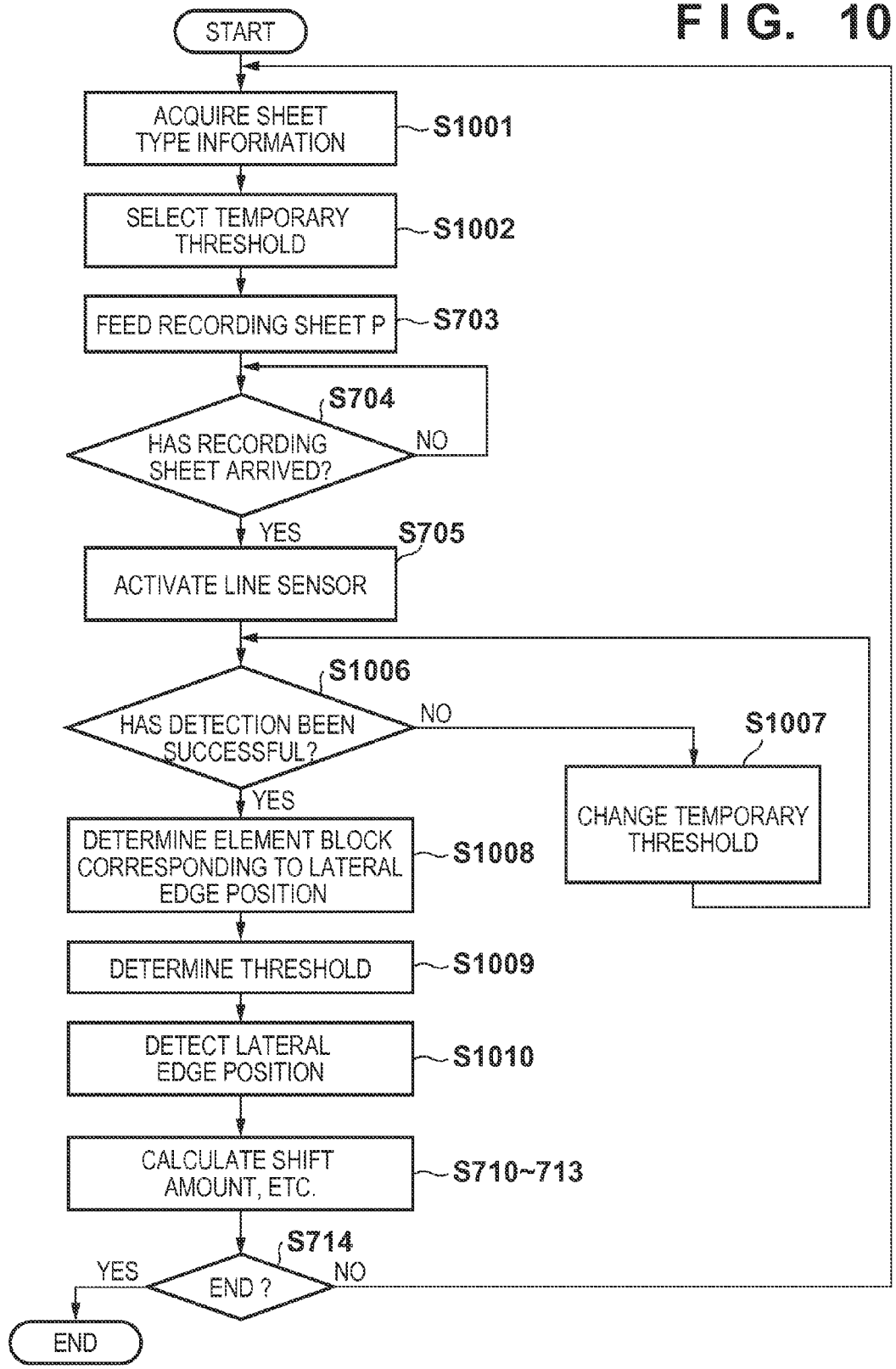
FIG. 10 is a flowchart showing the lateral registration correction including a threshold determination method.

The lateral registration correction including a method of determining the temporary threshold and a method of determining the true threshold, which are performed by the CPU 301, will be described with reference to FIG. 10. Note that parts described with reference to FIG. 7 are indicated by the same reference characters for simplicity of description.

In S1001, the CPU 301 acquires sheet type information using the sheet type sensor 914 or the console unit 5. Here, the sheet type information is associated with the temporary threshold and indicates the reflection characteristics of the recording sheet P. As described above, the reflection or transmission characteristics of the recording sheet P often vary among brands of the recording sheet P. For example, plain paper and recycled paper (e.g., straw paper etc.) have significantly different optical densities of the surface. Therefore, the light level varies depending on the sheet type, and therefore, the true threshold appropriate for binarization also varies depending on the sheet type. The sheet type sensor 914 is provided in the conveyance path upstream of the registration roller pair 26. The surface of the recording sheet P is irradiated with light of a light emitting element, and reflected light from the surface is received by a light receiving element. The sheet type sensor 914 outputs data (the amount of the reflected light) indicating the sheet type (reflection characteristics). It is assumed that the storage device 320 stores a table or database in which sheet type data is associated with temporary thresholds. Note that, when the sheet type information is acquired using the console unit 5, the console unit 5 is used to input, as the sheet type information, information indicating the brand (trade name) of the recording sheet P or information indicating the optical density of the recording sheet P. It is assumed that the storage device 320 stores the table or database in which sheet type information is associated with temporary thresholds. For example, straw paper has a relatively smaller amount of reflected light than that of plain paper. Therefore, the temporary threshold for straw paper is determined to be lower than that for plain paper. The temporary threshold is set to a higher value than the level (dark level) of the output signal from the line sensor 25 that is acquired when the recording sheet P is not present below the line sensor 25. Thus, the sheet type sensor 914 or the console unit 5 functions as an acquiring unit that acquires sheet type information indicating the reflection characteristics of the sheet surface.

In S1002, the CPU 301 determines the temporary threshold using the threshold setting unit 913. In accordance with an instruction from the CPU 301, the threshold setting unit 913 references the database stored in the storage device 320 to determine a temporary threshold corresponding to the acquired sheet type information. Note that if the sheet type information is numerical data, such as an optical density, a reflectance, or the like, the CPU 301 or the threshold setting unit 913 may calculate the temporary threshold by inputting data to a predetermined function. Thereafter, the above-described S703 to S705 are performed, and control proceeds to S1006. The CPU 301 sets the temporary threshold determined by the threshold setting unit 913 into the comparator 310. Thus, the CPU 301 or the threshold setting unit 913 functions as a first threshold determination unit that references the predetermined correspondence relationship between sheet type information of sheets and thresholds, to select a temporary threshold corresponding to the sheet type information.

In S1006, the CPU 301 determines whether or not a temporary lateral edge position as a first lateral edge position has been successfully detected. The method of detecting the temporary lateral edge position is as described in the description of S707. Specifically, the comparator 310 binarizes the output signal based on the temporary threshold. The counter 311 measures a period of time during which the binary signal is at the high level. As described above, this time period indicates the temporary lateral edge position. If the count value corresponds to the value of any of the element blocks Ea to Ee, the CPU 301 determines that the temporary lateral edge position has been successfully detected, and control proceeds to S1008. On the other hand, if the temporary lateral edge position has not been successfully detected, control proceeds to S1007.

In S1007, the CPU 301 changes the temporary threshold to facilitate detection of the temporary lateral edge position using the threshold setting unit 913. Thus, the CPU 301 functions as a temporary threshold selection unit that reselects another different temporary threshold. In general, if the temporary threshold is excessively high, the count value is zero. Therefore, the threshold setting unit 913 determines, as a new temporary threshold, a value that is lower by one step than the current value. If the magnitude of one step is excessively small, it is necessary to perform prescanning a lot of times. On the other hand, if the magnitude of one step is excessively large, the accuracy of determination of the temporary threshold decreases. Therefore, it is assumed that an appropriate magnitude of one step is previously obtained by an experiment. The CPU 301 sets the new temporary threshold into the comparator 310, and control returns to S1006. The comparator 310 compares the output signal OUT with another temporary threshold thus selected, to output a binary signal. The counter 311 measures a period of time during which the binary signal is at the high level to determine the temporary lateral edge position. If, in S1006, the temporary lateral edge position has been successfully detected, control proceeds to S1008.

In S1008, the CPU 301 determines an element block that is detecting the temporary lateral edge position. As described above, the count value that determines the temporary lateral edge position corresponds to the position at which the element block is located. A table indicating the correspondence relationship may be previously obtained and stored in the storage device 320. Therefore, the CPU 301 can determine the number (No.) of the element block corresponding to the count value (lateral edge position) by referencing the table. Thus, the CPU 301 functions as an element selection unit that selects an element block corresponding to the temporary lateral edge position based on the correspondence relationship between the positions of a plurality of element blocks included in the line sensor 25 and lateral edge positions.

In S1009, the CPU 301 determines the true threshold based on the levels of output signals from a plurality of pixels included in the element block corresponding to the temporary lateral edge position. The method of determining the true threshold is as described in the description of S706.

In S1010, the CPU 301 sets the true threshold into the comparator 310, and detects a true lateral edge position as a second lateral edge position. The method of determining the true lateral edge position is as described in the description of S707. Thereafter, the CPU 301 performs S710 to S714.

Timings relating to the lateral registration correction will be described with reference to FIGS. 11A and 11B. Here, parts different from those of FIGS. 8A and 8B will be mainly described. During the time period t6, the CPU 301 causes the line sensor controller 302 to output the first start pulse SP, thereby starting prescanning. As a result, an element block corresponding to the temporary lateral edge position is selected using the temporary threshold. Next, the CPU 301 causes the line sensor controller 302 to output the second start pulse SP, thereby performing a process of determining the true threshold. Finally, the CPU 301 causes the line sensor controller 302 to output the third start pulse SP, thereby determining the true lateral edge position using the true threshold.

Thus, even when the size of the recording sheet P is not known, prescanning is performed once using the temporary threshold to set the threshold calculation element, and therefore, the threshold calculation and the lateral edge detection can be performed using an element block located at the true lateral edge position of the recording sheet P. As a result, the true lateral edge position of the recording sheet P can be detected with higher accuracy.

Variations

In the above embodiments, it is assumed that the line sensor 25 detects the amount of reflected light from the recording sheet P. Alternatively, the LED 315 and the line sensor 25 may be arranged to face each other, thereby allowing the recording sheet P to pass between the LED 315 and the line sensor 25 and thereby allowing the line sensor 25 to detect the amount of transmitted light (or the amount of blocked light). In this case, the CPU 301 can determine the middle value between the amount of direct light (light level) that is not blocked by the recording sheet P and the amount of light (dark level) transmitted through the recording sheet P. In this case, the output signal is one that is output from an element block corresponding to the lateral edge position, as in the above embodiments.

Thus, according to the second embodiment, an element block that actually detects the lateral edge position is used to determine the true threshold, whereby the true threshold can be more accurately determined and the lateral edge position can be more accurately determined than in the conventional art. In particular, in this embodiment, the true threshold is determined based on the sheet type information, whereby the lateral edge position can be more accurately determined than in the conventional art. Specifically, a temporary threshold is determined based on the sheet type information, and a temporary lateral edge position is determined based on the temporary threshold. If a temporary lateral edge position is not detected, the temporary threshold is appropriately changed. If a temporary lateral edge position is detected, an element block corresponding to the lateral edge position is designated. The line sensor 25 scans the recording sheet P again. A true threshold is determined based on the level of the output signal OUT from the designated element block. The line sensor 25 scans the recording sheet P again. Thereafter, the lateral edge position is detected using the true threshold. Note that, in the second embodiment, the size sensor 314 is not necessarily required, and therefore, the number of parts can be reduced. Because the sheet type information is used to select the temporary threshold, it is advantageous that the sheet type information may be acceptable even when it is ambiguous to some extent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-098240, filed Apr. 23, 2012 which is hereby incorporated by reference herein in its entirety.

What is claimed is:

1. A position detection device for detecting a position of a sheet, comprising:
   a light detection unit configured to detect reflected light or transmitted light from the sheet, and including a plurality of element blocks arranged in a line, each of the plurality of element blocks including a plurality of reading pixels;
   an obtaining unit configured to obtain information regarding a sheet size;
   a threshold determination unit configured to determine a threshold based on signals output from an element block selected based on the information obtained by the obtaining unit;
   a binarization unit configured to compare signals output by the plurality of reading pixels included in the selected element block with the threshold determined by the threshold determination unit, to binarize the signals; and
   a position determining unit configured to determine, as the position of a lateral edge of the sheet in a lateral direction perpendicular to a conveyance direction of the sheet, a position at which the binary signal output by the binarization unit changes.

2. The position detection device according to claim 1, wherein the threshold determination unit is further configured to select an element block that corresponds to the size information acquired by the acquiring unit, based on a previously obtained correspondence relationship between positions of the plurality of element blocks in the light detection unit and the size of the sheet.

3. The position detection device according to claim 2, wherein
   the threshold determination unit determines the threshold based on a largest value and a smallest value of levels of the signals output from the plurality of reading pixels included in the selected element block.

4. The position detection device according to claim 3, wherein
   the threshold determination unit determines, as the threshold, a middle value between the largest and smallest values of the levels of the signals output from the plurality of reading pixels included in the selected element block.

5. The position detection device according to claim 3, wherein
   when the position determining unit fails to determine the position, the element selection unit reselects another one of the plurality of element blocks, and
   the threshold determination unit determines the threshold based on signals output from the plurality of reading pixels included in the another one of the plurality of element blocks.

6. The position detection device according to claim 3, wherein
   the threshold determination unit determines, as the threshold, a middle value between a level of a signal output from one of the plurality of reading pixels included in the selected element block wherein the one of the plurality of reading pixels has detected reflected light or transmitted light from the sheet, and a level of a signal output from one of the plurality of reading pixels included in the selected element block wherein the one of the plurality of reading pixels has not detected reflected light or transmitted light from the sheet.

7. The position detection device according to claim 3, wherein the threshold determination unit determines the threshold based on signals output from the plurality of reading pixels included in an element block different from the selected element block when the position determining unit fails to determine the position.

8. The position detection device according to claim 2, further comprising
   a conveyance guide configured to guide a sheet conveyed along with the conveyance guide,
   wherein the threshold determination unit determines the threshold based on signals output from the plurality of reading pixels included in the selected element block that receive light reflected from the sheet and light reflected from the conveyance guide.

9. The position detection device according to claim 1, further comprising:
   a movement unit configured to, when the position of the lateral edge determined by the position determine unit is not aligned with a predetermined position, translate the sheet in the lateral direction so that the position of the lateral edge is aligned with the predetermined position.

10. The position detection device according to claim 9, wherein
    the movement unit includes a roller pair configured to nip and convey the sheet,
    the roller pair corrects a skew of the sheet by a leading edge of the sheet in the conveyance direction of the sheet abutting the roller pair when the roller pair is not rotating, and
    the roller pair translates the sheet in the lateral direction by rotating while nipping the sheet.

11. A conveyance device for conveying a sheet, comprising:
    a light detection unit configured to detect reflected light or transmitted light from the sheet, and including a plurality of element blocks arranged in a line, each of the plurality of element blocks including a plurality of reading pixels;
    an obtaining unit configured to obtain information regarding a sheet size;
    a threshold determination unit configured to determine a threshold based on signals output from an element block selected based on the information obtained by the obtaining unit;
    a binarization unit configured to compare signals output by the plurality of reading pixels included in the selected element block with the threshold determined by the threshold determination unit, to binarize the signals; and
    a position determining unit configured to determine, as the position of a lateral edge of the sheet in a lateral direction perpendicular to a conveyance direction of the sheet, a position at which the binary signal output by the binarization unit changes from a high level to a low level or from a low level to a high level.

12. An image formation device comprising:
    a conveyance device including a position detection device configured to detect a position of a sheet; and
    an image formation unit configured to form an image on the sheet conveyed by the conveyance device,
    wherein
    the position detection device includes
        a light detection unit configured to detect reflected light or transmitted light from the sheet, and including a plurality of element blocks arranged in a line, each of the plurality of element blocks including a plurality of reading pixels,
        an obtaining unit configured to obtain information regarding a sheet size;

a threshold determination unit configured to determine a threshold based on signals output from an element block selected based on the information obtained by the obtaining unit, a binarization unit configured to compare signals output by the plurality of reading pixels included in the selected element block with the threshold determined by the threshold determination unit, to binarize the signals, and a position determining unit configured to determine, as the position of a lateral edge of the sheet in a lateral direction perpendicular to a conveyance direction of the sheet, a position at which the binary signal output by the binarization unit changes.

* * * * *